United States Patent
Yang et al.

(10) Patent No.: US 10,793,015 B2
(45) Date of Patent: Oct. 6, 2020

(54) CHARGING APPARATUS FOR ELECTRIC VEHICLE

(71) Applicants: Hyundai Motor Company, Seoul (KR); Kia Motors Corporation, Seoul (KR)

(72) Inventors: Sihun Yang, Gyeonggi-do (KR); Jongpil Kim, Gyeonggi-do (KR); Youngjin Kim, Incheon (KR); JinYoung Yang, Gyeonggi-do (KR); Jin Myeong Yang, Busan (KR); Woo Young Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 178 days.

(21) Appl. No.: 16/105,369

(22) Filed: Aug. 20, 2018

(65) Prior Publication Data

US 2019/0291585 A1 Sep. 26, 2019

(30) Foreign Application Priority Data

Mar. 21, 2018 (KR) .................. 10-2018-0032678

(51) Int. Cl.
*H02M 1/42* (2007.01)
*B60L 53/20* (2019.01)
*H02P 27/06* (2006.01)
*H02M 7/5387* (2007.01)
*H02M 1/44* (2007.01)

(52) U.S. Cl.
CPC ........... *B60L 53/20* (2019.02); *H02M 1/4225* (2013.01); *H02M 1/4233* (2013.01); *H02M 7/5387* (2013.01); *H02P 27/06* (2013.01); *B60L 2210/40* (2013.01); *H02M 1/44* (2013.01)

(58) Field of Classification Search
CPC .. B60L 53/20; B60L 2210/40; H02M 1/4225; H02M 1/4233; H02M 7/5387; H02M 1/44; H02M 1/42; H02P 27/06
See application file for complete search history.

(56) References Cited

U.S. PATENT DOCUMENTS

2019/0299793 A1* 10/2019 Kim .................... H02M 1/4216

* cited by examiner

*Primary Examiner* — Robert L Deberadinis
(74) *Attorney, Agent, or Firm* — Mintz Levin Cohn Ferris Glovsky and Popeo, P.C.; Peter F. Corless

(57) ABSTRACT

A charging apparatus for an electric vehicle is provided. The apparatus charges a vehicle battery upon receiving power from different power sources. The apparatus includes a motor generating power to drive the electric vehicle and an inverter supplying power to the motor. An AC power input terminal receives at least one of single-phase AC power and multi-phase AC power. A power factor corrector having a single three-leg half bridge circuit receives the AC input power through the AC power input terminal. A link capacitor is charged through a combination of the power factor corrector, the motor, and the inverter. A switch network has at least one switch for selectively connecting the AC power input terminal to the power factor corrector, the link capacitor, the motor, or the inverter. A controller operates the power factor corrector, the switch network, and the inverter based on a condition of received AC input power.

20 Claims, 9 Drawing Sheets

BI-PHASE SYMMETRIC
POWER SOURCE

FIG. 4B

SINGLE-PHASE
ASYMMETRIC
POWER SOURCE

FIG. 4C

THREE-PHASE
SYMMETRIC
POWER SOURCE

CHARGING APPARATUS FOR ELECTRIC VEHICLE

CROSS-REFERENCE TO RELATED APPLICATION

This application is based on and claims priority under 35 U.S.C. § 119 to Korean Patent Application No. 10-2018-0032678, filed on Mar. 21, 2018, the disclosure of which is incorporated by reference in its entirety.

BACKGROUND

1. Field of the Disclosure

The present disclosure relates to a vehicle, and more particularly to a charging apparatus for an electric vehicle that is driven using power of a motor.

2. Description of the Related Art

Unlike an internal combustion vehicle designed to acquire primary energy by burning fossil fuels, an electric vehicle is designed to use electric energy as a primary energy source. Therefore, the electric vehicle includes a high-voltage battery to store electric energy therein, a motor used as a power source, and an inverter to drive the motor. A charger for charging the battery of the electric vehicle may be classified into a slow-speed charger and a high-speed charger. The slow-speed charger may transmit commercial alternating current (AC) power to a vehicle without requiring any conversion. The high-speed charger may convert commercial AC power into direct current (DC) power, and may transmit the DC power to the vehicle. The slow-speed charger has a simplified structure and a low price, such that the slow-speed charger may be easily developed.

However, to use the slow-speed charger, an on board charger (OBC) is required to be mounted within the electric vehicle. The type of AC power provided through the slow-speed charger varies according to the country where the slow-speed chargers are installed. To charge a battery of the electric vehicle using various types of AC power, it is necessary for the on board charger (OBC) to be responsive to various types of AC power.

As a battery of the electric vehicle has higher capacity, a traveling distance of the electric vehicle provided with the battery charged once is also increasing. Therefore, many developers and vehicle manufacturers are conducting research into technology for increasing battery capacity of the electric vehicle. A large-capacity battery mounted within the electric vehicle unavoidably incurs an increase of a total charging time of the electric vehicle. To reduce the charging time of the large-capacity battery, there is a need to increase the OBC capacity. The increasing OBC capacity may unavoidably increase the size of constituent elements of the electric vehicle and production costs of the electric vehicle.

SUMMARY

Therefore, it is an aspect of the present disclosure to provide a charging apparatus for an electric vehicle, which has a reduced-sized and simplified structure, and charges a battery of the electric vehicle upon receiving power from various types of power sources. Additional aspects of the present disclosure will be set forth in part in the description which follows and, in part, will be obvious from the description, or may be learned by practice of the present disclosure.

In accordance with an aspect of the present disclosure, a charging apparatus for an electric vehicle may include: a motor configured to generate power required to drive the electric vehicle; an inverter configured to supply power to the motor; an alternating current (AC) power input terminal configured to receive at least one of single-phase AC power and multi-phase AC power; a power factor corrector having a single three-leg half bridge circuit configured to receive the AC input power through the AC power input terminal; a link capacitor configured to be charged through at least one of combinations of the power factor corrector, the motor, and the inverter; a switch network having at least one switch for selectively connecting the AC power input terminal to the power factor corrector, the link capacitor, the motor, or the inverter; and a controller configured to operate the power factor corrector, the switch network, and the inverter according to a condition of AC input power received through the AC power input terminal.

The switch network may further include a first switch disposed between the link capacitor and the inverter. The switch network may further include a second switch disposed between the inverter and a battery. The switch network may further include a third switch disposed between any one of three legs of the power factor corrector and the inverter. The switch network may further include a fourth switch disposed between a neutral point of the motor and a high-speed charging terminal. The switch network may further include a fifth switch and a sixth switch respectively disposed between the high-speed charging terminal and both ends of the battery.

The controller may be configured to perform the current mode duty control to reduce the leakage current in the switching control of the power factor corrector. Through control of the power factor corrector, the switch network, and the inverter, the controller may be configured to convert the power factor corrector into a plurality of different types of converters to be responsive to the condition of the AC input power. The condition of the AC input power may include a multi-phase condition and a single-phase condition of the AC input power. The condition of the AC input power may include a symmetric power condition and an asymmetric power condition of the AC input power.

In accordance with another aspect of the present disclosure, a charging apparatus for an electric vehicle may include: a motor configured to generate power required to drive the electric vehicle; an inverter configured to supply power to the motor; an alternating current (AC) power input terminal configured to receive at least one of single-phase AC power and multi-phase AC power; a power factor corrector having a single three-leg half bridge circuit configured to receive the AC input power through the AC power input terminal; a link capacitor configured to be charged through at least one of combinations of the power factor corrector, the motor, and the inverter; a switch network having at least one switch for selectively connecting the AC power input terminal to the power factor corrector, the link capacitor, the motor, or the inverter; and a controller configured to operate the power factor corrector, the switch network, and the inverter according to a condition of AC input power received through the AC power input terminal. The switch network may further include a first switch disposed between the link capacitor and the inverter; a second switch disposed between the inverter and a battery; and a third switch disposed between any one of the three legs of the power factor corrector and the inverter.

The switch network may further include a fourth switch disposed between a neutral point of the motor and a high-speed charging terminal. The switch network may further include a fifth switch and a sixth switch respectively disposed between the high-speed charging terminal and both ends of the battery. The controller may be configured to perform the current mode duty control to reduce the leakage current in the switching control of the power factor corrector. Through control of the power factor corrector, the switch network, and the inverter, the controller may be configured to convert the power factor corrector into a plurality of different types of converters, to be responsive to the condition of the AC input power. The condition of the AC input power may include a multi-phase condition and a single-phase condition of the AC input power. The condition of the AC input power may include a symmetric power condition and an asymmetric power condition of the AC input power.

In accordance with another aspect of the present disclosure, a charging apparatus for an electric vehicle may include: a motor configured to generate power required to drive the electric vehicle; an inverter configured to supply power to the motor; an alternating current (AC) power input terminal configured to receive at least one of single-phase AC power and multi-phase AC power; a power factor corrector having a single three-leg half bridge circuit configured to receive the AC input power through the AC power input terminal; a link capacitor configured to be charged through at least one of combinations of the power factor corrector, the motor, and the inverter; a switch network having at least one switch for selectively connecting the AC power input terminal to the power factor corrector, the link capacitor, the motor, or the inverter; and a controller configured to operate the power factor corrector, the switch network, and the inverter according to a condition of AC input power received through the AC power input, and perform the current mode duty control.

The current mode duty control is performed to reduce the leakage current in the switching control of the power factor corrector. Through control of the power factor corrector, the switch network, and the inverter, the controller may be configured to convert the power factor corrector into a plurality of different types of converters to responsive to the condition of the AC input power.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings, wherein like reference numerals refer to like elements throughout.

Figure 1:
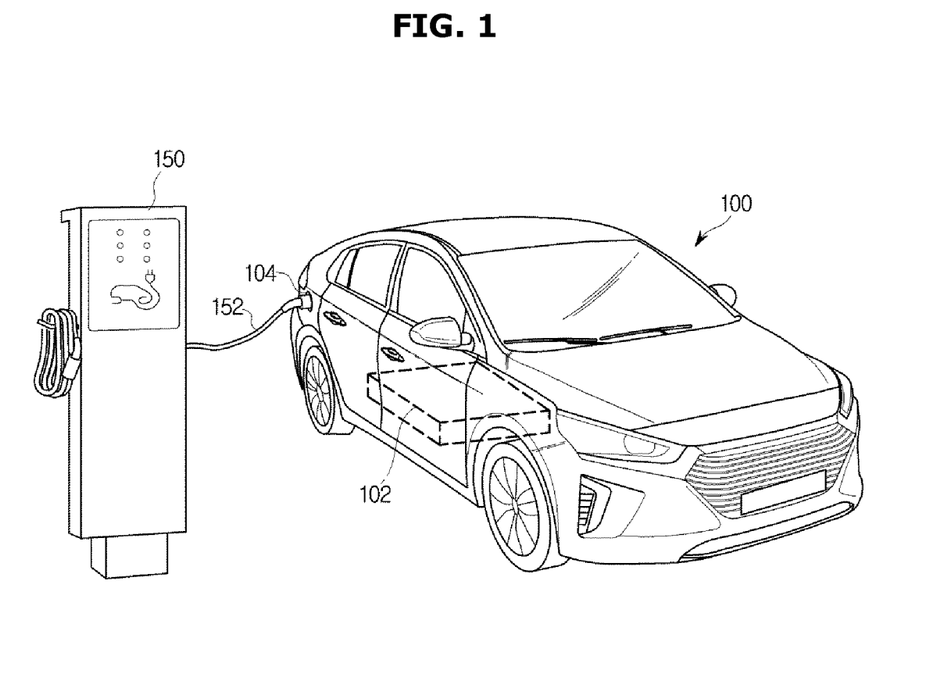
FIG. 1 is a view illustrating the appearance of an electric vehicle according to an exemplary embodiment.

FIG. 1 is a view illustrating the appearance of an electric vehicle according to an exemplary embodiment. Referring to FIG. 1, the electric vehicle 100 may include a motor 212 (see FIG. 2). Therefore, the electric vehicle 100 may further include a high-voltage battery 102 configured to store power to be used for driving the motor 212. An auxiliary battery 208 (see FIG. 2) may also be disposed on one side of the engine room in a general internal combustion vehicle. However, a large high-capacity high-voltage battery 212 is required for the electric vehicle 100 although an auxiliary battery 208 (see FIG. 2) is disposed at one side of an engine compartment of a general internal combustion vehicle. In the electric vehicle 100 according to the exemplary embodiment, the high-voltage battery 102 may be installed at a lower space of a rear passenger seat. Power stored in the high-voltage battery 102 may be used to generate power by driving the motor 212 (see FIG. 2). The high-voltage battery 102 according to the exemplary embodiment may be a lithium battery.

The electric vehicle 100 may include a charging socket 104. A charging connector 152 of an external slow-speed charger 150 may be connected to the charging socket 104, to charge the high-voltage battery 102 with electricity or power. In other words, when the charging connector 152 of the slow-speed charger 150 may be connected to the charging socket 104 of the electric vehicle 100, the high-voltage battery 102 of the electric vehicle 100 may be charged with electricity or power.

Figure 2:
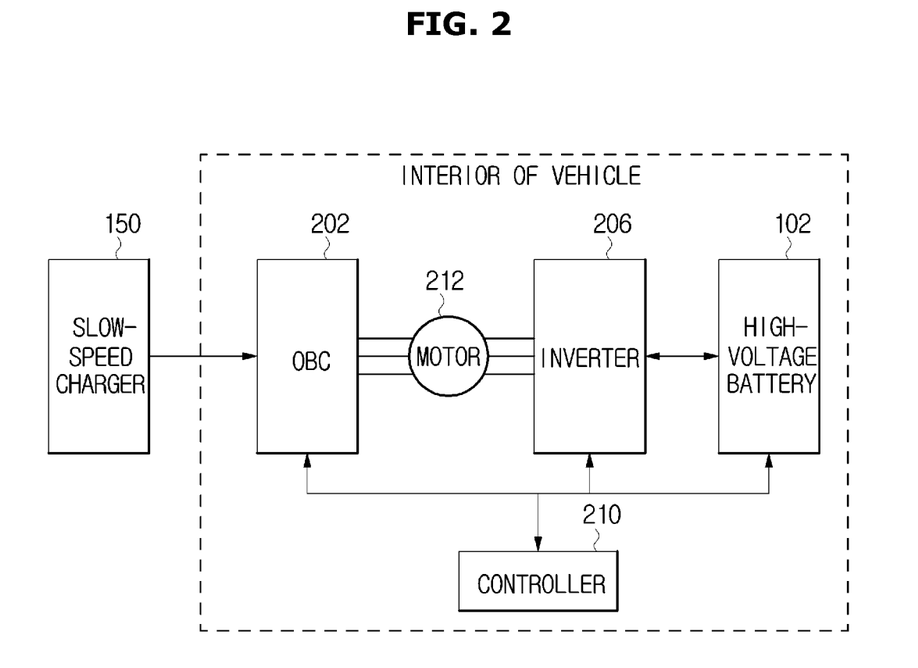
FIG. 2 is a block diagram illustrating a charging apparatus for an electric vehicle according to an exemplary embodiment.

FIG. 2 is a block diagram illustrating a charging apparatus for the electric vehicle according to an exemplary embodiment. Referring to FIG. 2, the slow-speed charger 150 may be used to charge the high-voltage battery 102. The high-voltage battery 102 may have a charging voltage of about 400V-800V. The slow-speed charger 150 may be configured to supply AC power to the electric vehicle 100 without change. The AC power supplied through the slow-speed charger 150 may be converted into a predetermined DC voltage in the electric vehicle 100.

An on board charger (OBC) 202 mounted within the electric vehicle 100 may be used to charge the high-voltage battery 102. The OBC 202 may be configured to convert AC power supplied from the slow-speed charger 150 into a DC voltage of about 800V, and charge the high-voltage battery 102 with the DC voltage of about 800V. The slow-speed charger 150 may be configured to supply AC power to the electric vehicle 100 without change (e.g., without requiring any conversion). The AC voltage supplied through the slow-speed charger 150 may be converted into a DC voltage by the OBC 202, and may be used to charge the high-voltage battery 102.

Referring again to FIG. 2, an inverter 206 may be configured to convert the power of the high-voltage battery 102 to have the electrical characteristics required by the motor 212, and transfer the power to the motor 212. The motor 212 may be configured to generate power by being rotated by the power transmitted through the inverter 206. In the charging apparatus shown in FIG. 2, the motor 212 and the inverter 206 may be used for charging the high-voltage battery 102 together with the OBC 202 as required. A controller 210 may be configured to operate the OBC 202, the inverter 206, and the motor 212 to charge the high-voltage battery 102. When the controller 210 operates the OBC 202, the inverter 206, and the motor 212 to charge the high voltage battery 102, the controller 210 may be configured to perform the current mode duty control to reduce the leakage current that may occur due to the asymmetry of the input AC power.

Figure 3:
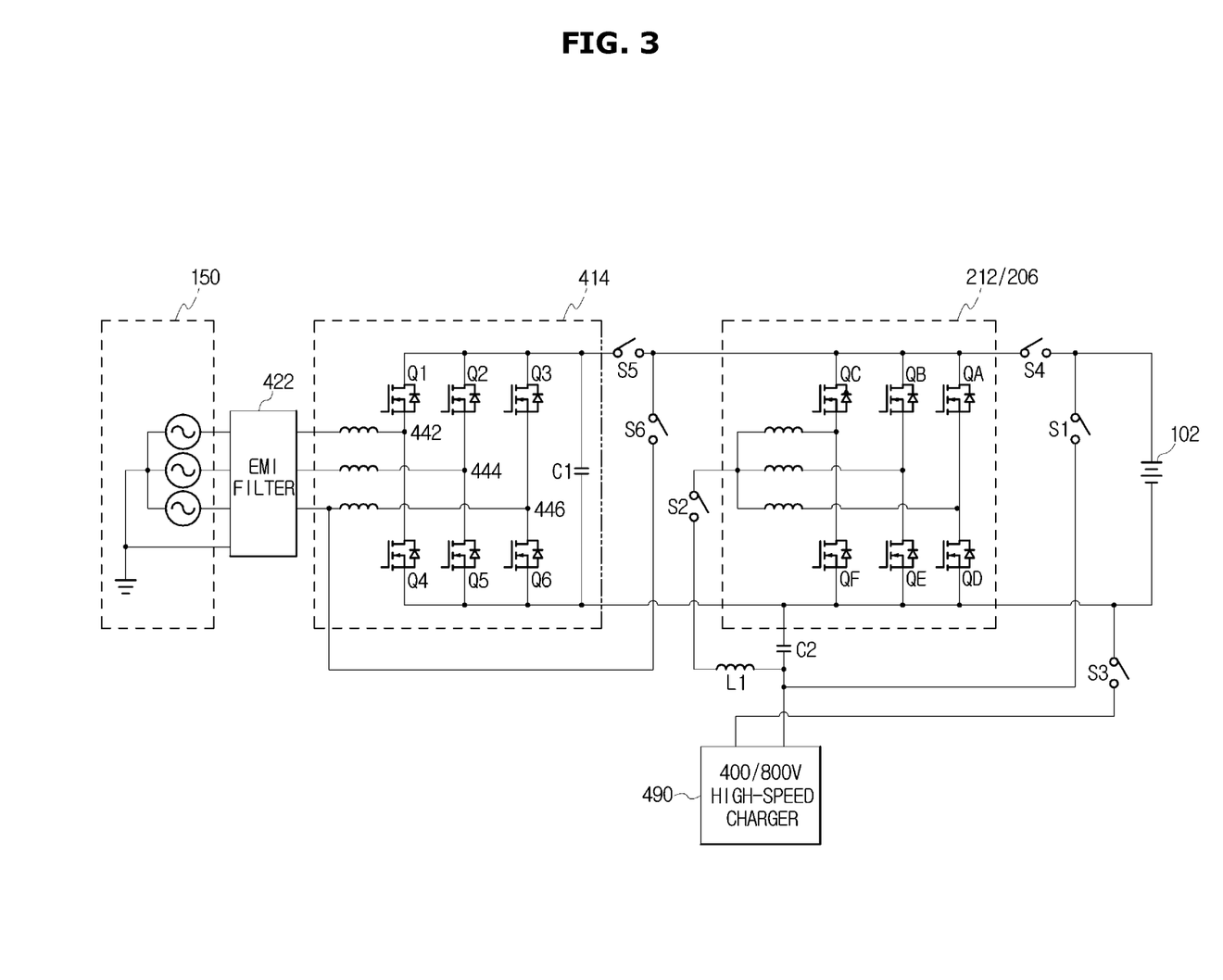
FIG. 3 is a view illustrating a circuit configuration of a charging apparatus according to an exemplary embodiment.

FIG. 3 is a view illustrating a circuit configuration of a charging apparatus according to an exemplary embodiment. FIG. 3 illustrates a structure in which the OBC 202 according to the exemplary embodiment cooperates with the inverter 206 and the motor 212 to charge the high-voltage battery 102. By controlling a charge request voltage according to a charge request voltage of the high voltage battery 102 by utilizing the motor 212 and the inverter 206, the structure is capable of being simplified, reduced in size, and low in manufacturing cost compared to using the conventional DC/DC converter.

In addition, the conventional DC/DC converter includes a transformer, so insulation measures are essential. In contrast, since the charging apparatus according to the exemplary embodiment omits the transformer and utilizes the motor 212 and the inverter 206, it may be possible to implement a non-insulation charging apparatus that does not require insulation measures. However, the current mode duty control may be performed during the switching control of a boost power factor corrector 414 to reduce the low frequency leakage current that may occur in the non-insulation charging apparatus.

The OBC 202 may include an electromagnetic interference (EMI) filter 422, the boost power factor corrector 414, and a power relay assembly 416. The power relay assembly 416 may include switches S1, S2, S3, S4, S5 and S6 shown in FIG. 3. The AC power may be received from an external AC power source to the boost power factor corrector 314 through the EMI filter 422. The EMI filter 422 may remove noise included in the received AC power.

The boost power factor corrector 414 may include a 3-leg half bridge circuit composed of switching elements Q1, Q2, Q3, Q4, Q5, and Q6. A first leg 442 disposed between the switching elements Q1 and Q4, a second leg 444 disposed between the switching elements Q2 and Q5, and a third leg 446 disposed between the switching elements Q3 and Q6 may be connected to the EMI filter 422. Each of the first to third legs 442, 444, and 446 may include an inductor component.

A capacitor C1 operating as a power factor correction (PFC) link capacitor may be disposed in the boost power factor corrector 414. The capacitor C1 may be disposed between both ends of the half bridge circuit. The inverter 206 may include six switching elements QA, QB, QC, QD, QE, and QF. A current generated by the switching elements QC and QF, a current generated by the switching elements QB and QE, and a current generated by the switching elements QA and QD may be respectively transmitted to three-phase coils of the motor 212.

A high-speed charger 490 may be connected to a node between the lower end of the boost power factor corrector 414 and the lower end of the inverter 206 through a capacitor C2. The high-speed charger 490 may be configured to charge the high-voltage battery 102 at high speed with about 400V or 800V. Accordingly, a positive (+) terminal of the high-speed charger 490 may be connected to the positive (+) terminal of the high-voltage battery 102 via the switch S1, and may also be connected to a neutral point of the motor 212 through a inductor L1 and a switch S2. In other words, the high-speed charger 490 may be connected to the positive (+) terminal of the high-voltage battery 102 through the switch S1 and to the neutral point of the motor 212 through the switch S2. A negative (−) terminal of the high-speed charger 490 may be connected to the negative (−) terminal of the high-voltage battery 102 via a switch S3 and to the lower end of the inverter 206.

A switch S4 may be connected between an upper end of the inverter 206 and the positive (+) terminal of the high-voltage battery 102. The switch S3 may be connected between the switch S4 and the node to which the high-voltage battery 102 is connected and the positive (+) terminal of the high-speed charger 290. The switch S4 may be switched to allow the inverter 206 to drive the motor 212 or to charge the high-voltage battery 102. In other words, when the switch S4 is turned on, the inverter 206 may be configured to drive the motor 212 to generate power. Conversely, when the switch S4 is turned off, the inverter 206 may be used to charge the high-voltage battery 102 with the motor 212.

A switch S5 may be connected between the upper end of the boost power factor corrector 414 and the upper end of the inverter 206. A switch S6 may be connected to the path from the node where the switch S5 and the upper end of the inverter 206 are connected to the switch S5 to the leg 446 of the 3-leg half bridge circuit. In other words, the leg 446 of the 3-leg half bridge circuit of the boost power factor corrector 414 and the upper end of the inverter 206 may be connected or disconnected by turning on/off the switch S6. The two switches S5 and S6 may be provided for the current mode (CM) duty control of the boost power factor corrector 414. When the switch S5 is turned off and the switch S6 is turned on, the CM duty control of the boost power factor corrector 414 may be performed.

The plurality of switches S1, S2, S3, S4, S5, and S6 and the plurality of switching elements Q1, Q2, Q3, Q4, Q5, Q6, QA, QB, QC, QD, QE, QF included in the switch network provided in the charging apparatus may be turned on or off by the controller 210 shown in FIG. 2. According to the exemplary embodiment, the high-voltage battery 102 may be charged with various types of AC powers through various on/off combinations of the plurality of switches S1, S2, S3, S4, S5 and S6 included in the switch network. Various types of AC powers may hereinafter be described with reference to FIG. 4.

Figure 4A:
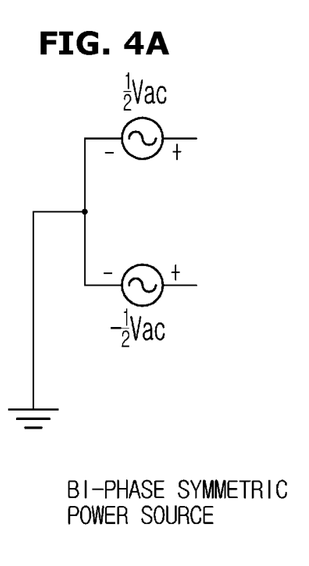
FIGS. 4A-4C are views illustrating various types of power sources embedded in a charging apparatus according to an exemplary embodiment.

FIGS. 4A-4C are views illustrating various types of power sources embedded in a charging apparatus according to an exemplary embodiment. FIG. 4A is a view illustrating a bi-phase symmetric power source. Referring to FIG. 4A, the bi-phase symmetric power source may allow a power-supply voltage to be divided into two voltages ½ Vac and −½ Vac. Since two voltages ½ Vac and −½ Vac may have opposite phases, the two voltages may be referred to as a bi-phase symmetric power source. The bi-phase symmetric power source shown in FIG. 4A is mainly used in North America.

Figure 4B:
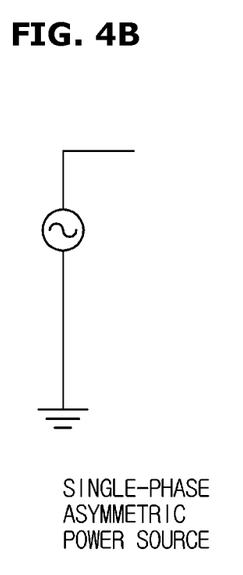

FIG. 4B is a view illustrating a single-phase asymmetric power source. Referring to FIG. 4B, the single-phase asymmetric power source may provide a power-supply voltage formed in a single voltage (Vac) having a single phase. Since the single voltage (Vac) has a single phase, the single voltage (Vac) may be referred to as a single-phase asymmetric power source. The single-phase asymmetric power-supply shown in FIG. 4B is mainly used in Korea, North America, and Europe.

Figure 4C:
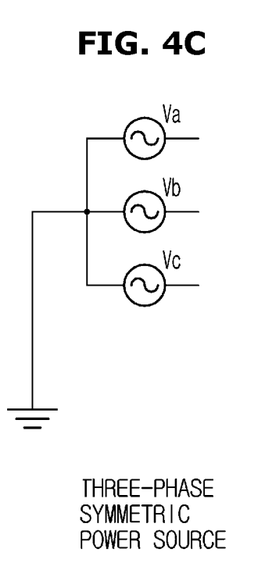

FIG. 4C is a view illustrating a three-phase symmetric power source. Referring to FIG. 4C, the three-phase asymmetric power source may allow a power-supply voltage to be divided into three voltages Va, Vb, and Vc. Since three voltages Va, Vb, and Vc may have different phases, the three voltages may be referred to as a three-phase asymmetric power source. The three-phase asymmetric power source shown in FIG. 4C is mainly used in Europe. Various types of AC power sources are used in individual countries as described above, such that the charging apparatus according to the exemplary embodiment aims to cope with various types of AC powers of the individual counties through the on/off combinations of the switch network.

A system power may be classified into a symmetric structure and an asymmetric structure, and the magnitude of the leakage current may vary depending on the symmetric/asymmetric structures. The leakage current may be relatively minimal in the case of the system power of the symmetrical structure and the leakage current may be relatively substantial in the case of the system power of the asymmetric structure. As mentioned in FIG. 3, when the switch S5 is turned off and the switch S6 is turned on, the CM duty control of the boost power factor corrector 414 may be performed to minimize the leakage current that may occur in the non-insulation charging apparatus.

Figure 5:
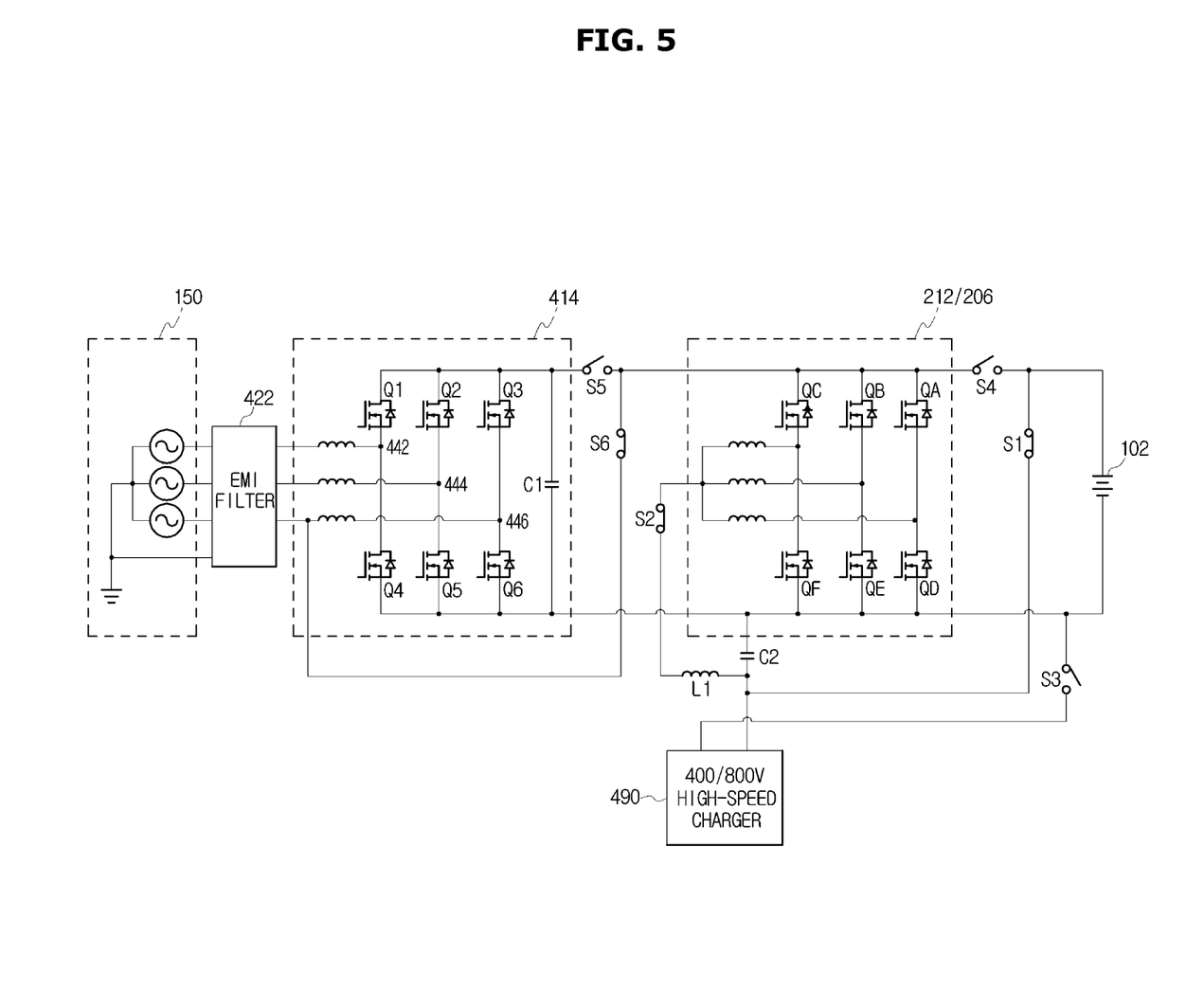
FIG. 5 is a view illustrating a state where a switch is turned off and a switch is turned on in a charging apparatus according to an exemplary embodiment.

FIG. 5 is a view illustrating a state where a switch S5 is turned off and a switch S6 is turned on in a charging apparatus according to an exemplary embodiment. As shown in FIG. 5, the switch S5 may be turned off to electrically isolate the boost power factor corrector 414 and the capacitor C1 from the motor 212 and the inverter 206. The switch S6 may also be turned on to electrically connect the upper end of the inverter 206 to the leg 446 of the boost power factor corrector 414, and the leg 446 of the boost power factor corrector 414 and the EMI filter 422 may be electrically isolated. As shown from the connection relationship between the slow-speed charger 150 and the EMI filter 422 shown in FIG. 5, one phase of the three-phase AC power received from the external slow-speed charger 150 through the EMI filter 422 may not be input to the boost power factor corrector 414 by electrically isolating the leg 446 of the boost power factor corrector 414. By turning off the switch S5 and turning on the switch S6, the structure of the charging apparatus according to the exemplary embodiment of the present disclosure may be represented by an equivalent circuit as shown in FIG. 6.

Figure 6:
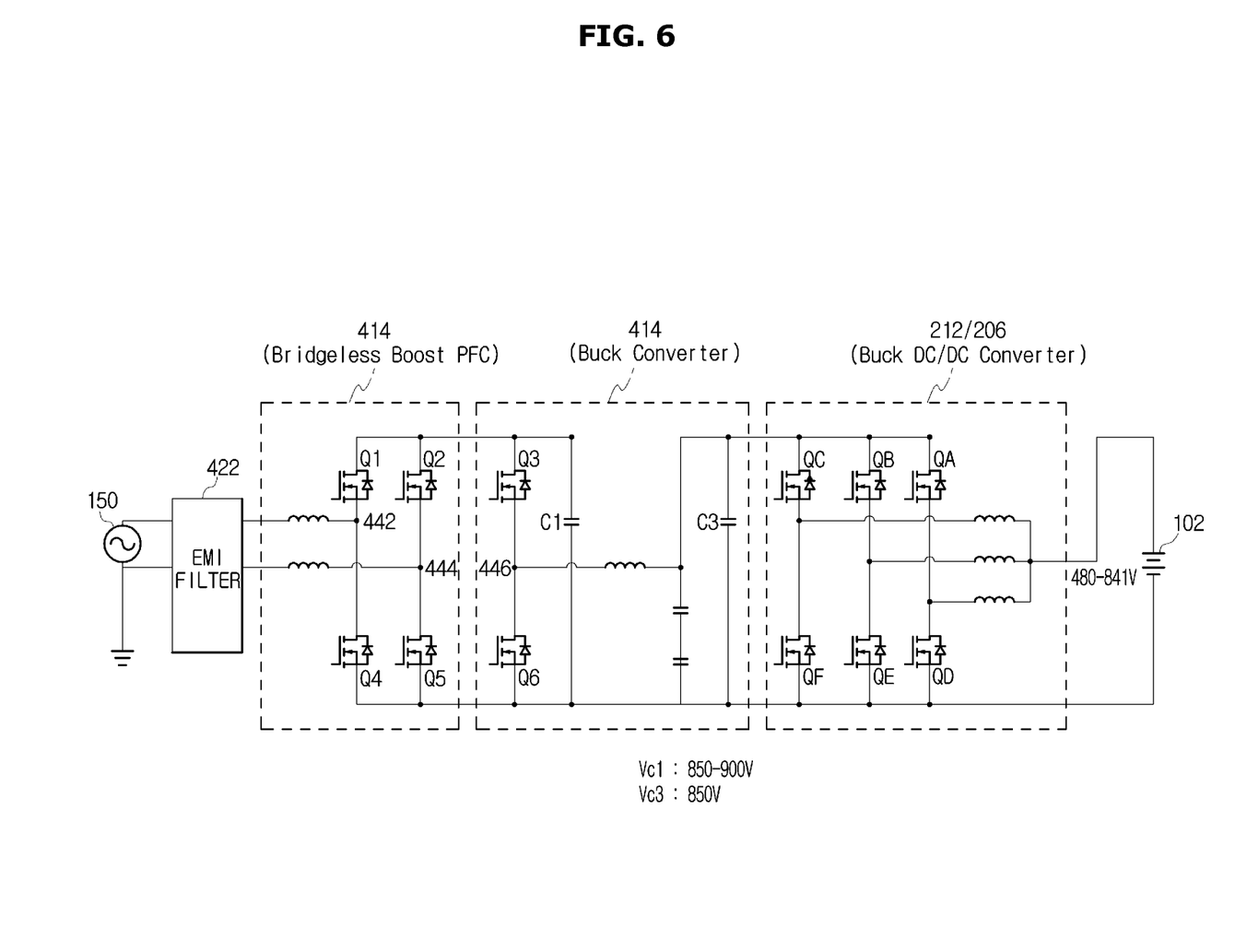
FIG. 6 is a view illustrating a changed structure of a charging apparatus according to an exemplary embodiment by the turn off of a switch and a turn on of a switch.

FIG. 6 is a view illustrating a changed structure of a charging apparatus according to an exemplary embodiment by a turn off of a switch S5 and a turn on of a switch S6. As shown in FIG. 6, the switch S5 may be turned off and the switch S6 may be turned on, such that the portion of the boost power factor corrector 414 including the legs 442 and 444 may operate as a bridgeless boost power factor corrector, and the remaining portion of the boost power factor corrector 414 including the leg 446 may operate as a buck converter. The motor 212/the inverter 212 may be configured to operate as a buck DC/DC converter. In the structure shown in FIG. 6, for example, when a voltage between both ends of the capacitor C1 is about 850V-900V, the voltage of about 850V-900V between both ends of the capacitor C1 may be used for charging the high-voltage battery 102 in a state of being lowered to about 480V-841V by the motor 212/the inverter 212 operating as the buck DC/DC converter. When the structure is changed to the three-stage as shown in FIG. 6 through the turn-off of the switch S5 and the turn-on of the switch S6 as shown in FIG. 5, the CM duty control (switching control) of the boost power factor corrector 414 may be performed to reduce the low frequency leakage current due to symmetry/asymmetry of the system power.

Figure 7:
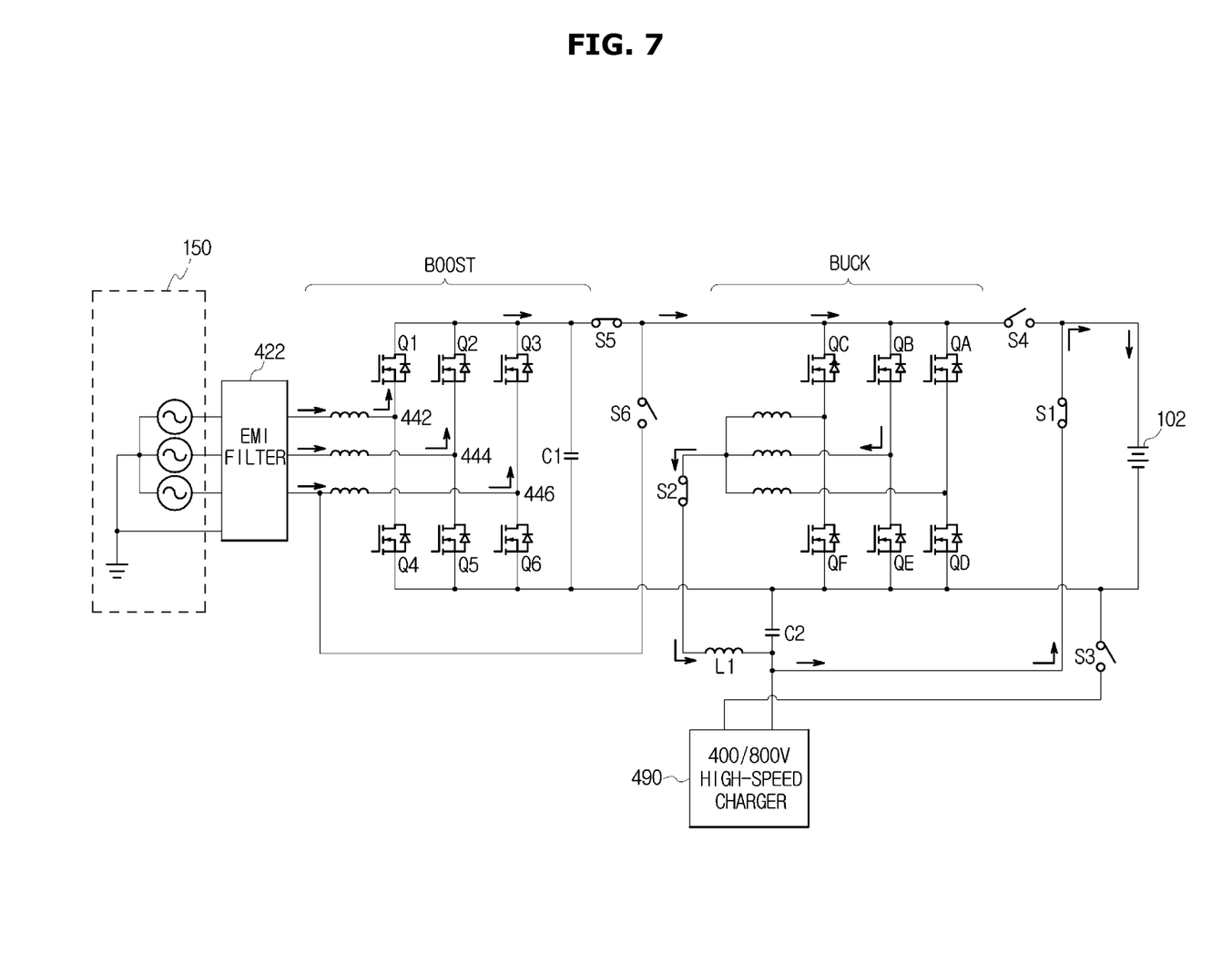
FIG. 7 is a view illustrating the operation of a charging apparatus according to an exemplary embodiment when system power is three-phase alternating current (AC) power.

FIG. 7 is a view illustrating the operation of a charging apparatus according to an exemplary embodiment when system power is three-phase alternating current (AC) power. As shown in FIG. 7, when the system power is a three-phase AC power, the switches S1, S2 and S5 of the charging apparatus according to the exemplary embodiment may be turned on and the switches S3, S4 and S6 may be turned off. The leg 446 of the boost power factor corrector 414 and the inverter 206 may be electrically isolated according to the on/off of the switch network. In addition, the inverter 206 may not be electrically connected directly to the high-voltage battery 102 but may be electrically connected to the high-voltage battery 102 through the motor 212. In this structure, the three-phase AC power supplied from the slow-speed charger 150 may be transmitted to the high-voltage battery 102 through the switch S1 by passing the boost power factor corrector 414, the switch S5, the inverter 206 and the motor 212, in sequence thereby charging the high-voltage battery 102.

Figure 8:
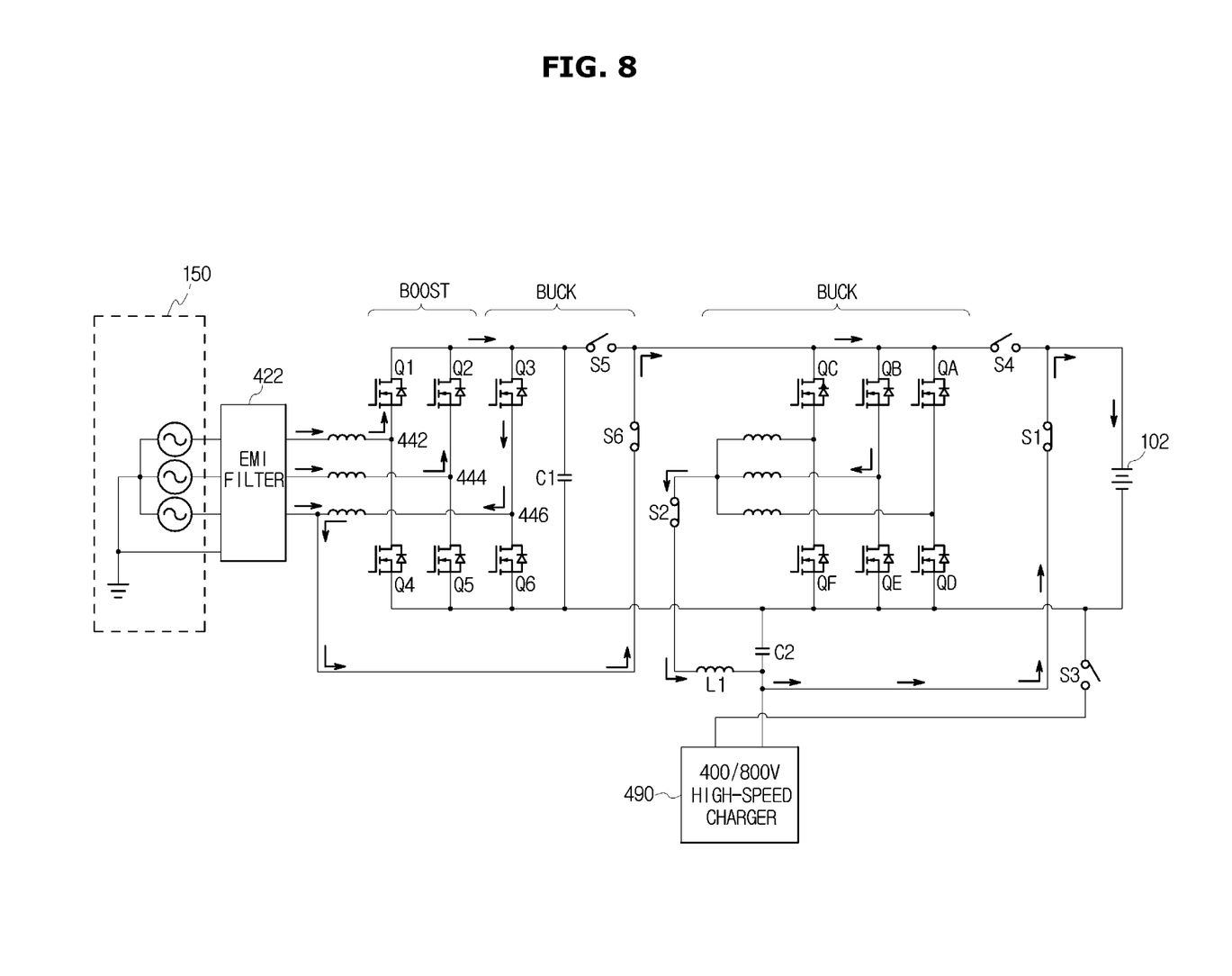
FIG. 8 is a view illustrating the operation of a charging apparatus according to an exemplary embodiment when system power is single-phase alternating current (AC) power.

FIG. 8 is a view illustrating the operation of a charging apparatus according to an exemplary embodiment when system power is single-phase alternating current (AC) power. As shown in FIG. 8, when the system power is a single-phase AC power, the switches S1, S2 and S6 of the charging apparatus according to the exemplary embodiment may be turned on and the switches S3, S4 and S5 of the charging apparatus according to the exemplary embodiment may be turned off. One phase of the three-phase AC power may be electrically isolated from the leg 446 of the boost power factor corrector 414 according to the on/off of the switch network, but the leg 446 of the boost power factor corrector 414 and the inverter 206 may be electrically connected. In addition, the inverter 206 and the high-voltage battery 102 may not be electrically connected directly but may be electrically connected to the high-voltage battery 102 via the motor 212. In this structure, the single-phase AC power supplied from the slow-speed charger 150 may be transmitted to the high-voltage battery 102 through the switch S1 by passing the leg 446 of the boost power factor corrector 414, the switch S5, the inverter 206 and the motor 212, thereby charging the high-voltage battery 102.

Figure 9:
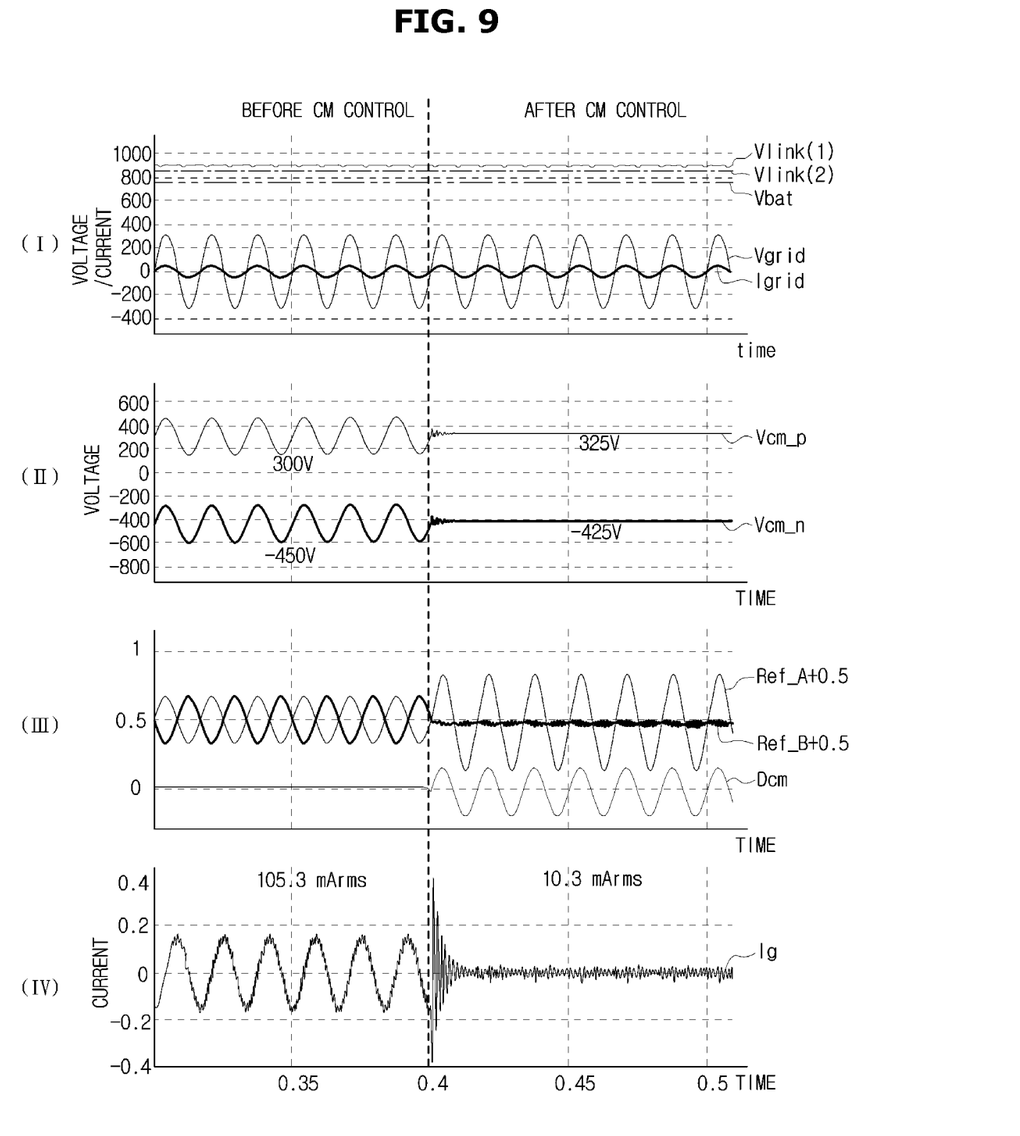
FIG. 9 is a view illustrating simulation results of a charging apparatus according to an exemplary embodiment.

As shown in FIGS. 7 and 8, the power transmission path may be adjusted differently through on/off combinations of the switch network based on whether the input AC power (system power) supplied from the slow-speed charger 150 is three-phase or single-phase, and by switching control the boost power factor corrector 414 as the CM duty control manner, the leakage current generated due to the asymmetric characteristics of the input AC power (system power) during the charging process of the high-voltage battery 102 may be significantly reduced FIG. 9 is a view illustrating simulation results of a charging apparatus according to an exemplary embodiment of the present disclosure. Referring to simulation results shown in FIG. 9, the magnitudes of the respective leakage currents Ig are substantially different based on whether the CM duty control is performed. When the CM duty control is not performed, the leakage current Ig is 105.3 mArms, and when the CM duty control is performed, the leakage current Ig is substantially reduced to 10.3 mArms. The leakage current Ig required by the safety standard should be about 15 mArms or less. In the case of asymmetrical power, the leakage current Ig is 105.3 mArms, which exceeds the value required by the safety standard. However, by performing the CM duty control in the charging apparatus according to the exemplary embodiment, the leakage current Ig may be substantially reduced from about 103 mArms to about 10.3 mArms, satisfying the condition of about 15 mArms or less required in the safety standard.

As is apparent from the above description, the charging apparatus for the electric vehicle according to the exemplary embodiments of the present disclosure has a reduced-sized and simplified structure, and charges a battery of the electric vehicle upon receiving power from various types of power sources.

It is to be understood that the above description is only illustrative of technical ideas, and various modifications, alterations, and substitutions are possible without departing from the essential characteristics of the present disclosure. Therefore, the exemplary embodiments and the accompanying drawings described above are intended to illustrate and not limit the technical idea, and the scope of technical thought is not limited by these exemplary embodiments and accompanying drawings. The scope of which is to be construed in accordance with the following claims, and all technical ideas which are within the scope of the same should be interpreted as being included in the scope of the right.

What is claimed is:

1. A charging apparatus for an electric vehicle, comprising:
    a motor configured to generate power required to drive the electric vehicle;
    an inverter configured to supply power to the motor;
    an alternating current (AC) power input terminal configured to receive at least one of single-phase AC power and multi-phase AC power;
    a power factor corrector having a single three-leg half bridge circuit configured to receive the AC input power through the AC power input terminal;
    a link capacitor configured to be charged through at least one of combinations of the power factor corrector, the motor, and the inverter;
    a switch network having at least one switch configured to selectively connect the AC power input terminal to the power factor corrector, the link capacitor, the motor, or the inverter; and
    a controller configured to operate the power factor corrector, the switch network, and the inverter based on a condition of AC input power received through the AC power input terminal.

2. The charging apparatus according to claim 1, wherein the switch network further includes:
    a first switch disposed between the link capacitor and the inverter.

3. The charging apparatus according to claim 2, wherein the switch network further includes:
    a second switch disposed between the inverter and a battery.

4. The charging apparatus according to claim 3, wherein the switch network further includes:
    a third switch disposed between any one of three legs of the power factor corrector and the inverter.

5. The charging apparatus according to claim 4, wherein the switch network further includes:
    a fourth switch disposed between a neutral point of the motor and a high-speed charging terminal.

6. The charging apparatus according to claim 5, wherein the switch network further includes:
    a fifth switch and a sixth switch respectively disposed between the high-speed charging terminal and both ends of the battery.

7. The charging apparatus according to claim 1, wherein the controller is configured to perform the current mode duty control to reduce the leakage current in the switching control of the power factor corrector.

8. The charging apparatus according to claim 1, wherein through control of the power factor corrector, the switch network, and the inverter, the controller is configure to convert the power factor corrector into a plurality of different types of converters, to be responsive to the condition of the AC input power.

9. The charging apparatus according to claim 1, wherein the condition of the AC input power includes a multi-phase condition and a single-phase condition of the AC input power.

10. The charging apparatus according to claim 1, wherein the condition of the AC input power includes a symmetric power condition and an asymmetric power condition of the AC input power.

11. A charging apparatus for an electric vehicle, comprising:
- a motor configured to generate power required to drive the electric vehicle;
- an inverter configured to supply power to the motor;
- an alternating current (AC) power input terminal configured to receive at least one of single-phase AC power and multi-phase AC power;
- a power factor corrector having a single three-leg half bridge circuit configured to receive the AC input power through the AC power input terminal;
- a link capacitor configured to be charged through at least one of combinations of the power factor corrector, the motor, and the inverter;
- a switch network having at least one switch configured to selectively connect the AC power input terminal to the power factor corrector, the link capacitor, the motor, or the inverter; and
- a controller configured to operate the power factor corrector, the switch network, and the inverter based on a condition of AC input power received through the AC power input terminal,
- wherein the switch network further includes:
- a first switch disposed between the link capacitor and the inverter;
- a second switch disposed between the inverter and a battery; and
- a third switch disposed between any one of three legs of the power factor corrector and the inverter.

12. The charging apparatus according to claim 11, wherein the switch network further includes:
- a fourth switch disposed between a neutral point of the motor and a high-speed charging terminal.

13. The charging apparatus according to claim 12, wherein the switch network further includes:
- a fifth switch and a sixth switch respectively disposed between the high-speed charging terminal and both ends of the battery.

14. The charging apparatus according to claim 11, wherein the controller is configured to perform the current mode duty control to reduce the leakage current in the switching control of the power factor corrector.

15. The charging apparatus according to claim 11, wherein through control of the power factor corrector, the switch network, and the inverter, the controller is configured to convert the power factor corrector into a plurality of different types of converters to be responsive to the condition of the AC input power.

16. The charging apparatus according to claim 11, wherein the condition of the AC input power includes a multi-phase condition and a single-phase condition of the AC input power.

17. The charging apparatus according to claim 11, wherein the condition of the AC input power includes a symmetric power condition and an asymmetric power condition of the AC input power.

18. A charging apparatus for an electric vehicle, comprising:
- a motor configured to generate power required to drive the electric vehicle;
- an inverter configured to supply power to the motor;
- an alternating current (AC) power input terminal configured to receive at least one of single- phase AC power and multi-phase AC power;
- a power factor corrector having a single three-leg half bridge circuit configured to receive the AC input power through the AC power input terminal;
- a link capacitor configured to be charged through at least one of combinations of the power factor corrector, the motor, and the inverter;
- a switch network having at least one switch configured to selectively connect the AC power input terminal to the power factor corrector, the link capacitor, the motor, or the inverter; and
- a controller configured to operate the power factor corrector, the switch network, and the inverter based on a condition of AC input power received through the AC power input terminal, and perform the current mode duty control.

19. The charging apparatus according to claim 18, wherein the current mode duty control is performed to reduce the leakage current in the switching control of the power factor corrector.

20. The charging apparatus according to claim 18, wherein through control of the power factor corrector, the switch network, and the inverter, the controller is configured to convert the power factor corrector into a plurality of different types of converters to be responsive to the condition of the AC input power.

* * * * *